E. B. MANNING.

Molasses-Pitchers.

No. 6,065.

Reissued Sept. 22, 1874.

Witnesses.

J. H. Shumway

A. J. Tibbits

Manning, Bowman & Co.
assignees of Edw.d B. Manning
Inventor
By Atty.
Wm. C. Earl

THE GRAPHIC CO. PHOTO-LITH. 39 & 41 PARK PLACE, N.Y.

UNITED STATES PATENT OFFICE.

EDWARD B. MANNING, OF WEST MERIDEN, CONNECTICUT, ASSIGNOR TO MANNING, BOWMAN & CO.

IMPROVEMENT IN MOLASSES-PITCHERS.

Specification forming part of Letters Patent No. 140,515, dated July 1, 1873; reissue No. 6,065, dated September 22, 1874; application filed February 26, 1874.

*To all whom it may concern:*

Be it known that I, EDWARD B. MANNING, of West Meriden, in the county of New Haven and State of Connecticut, have invented a new Improvement in Molasses-Pitchers; and I do hereby declare the following, when taken in connection with the accompanying drawings and the letters of reference marked thereon, to be a full, clear, and exact description of the same, and which said drawings constitute part of this specification, and represent, in—

Figure 1:
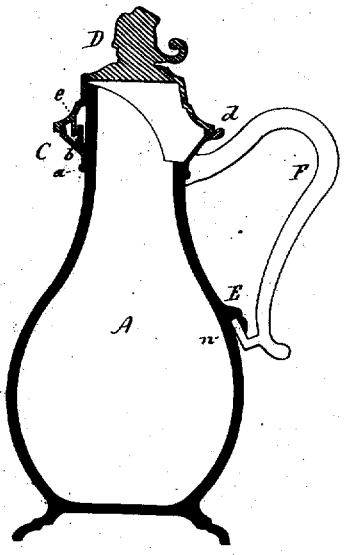
Figure 2:
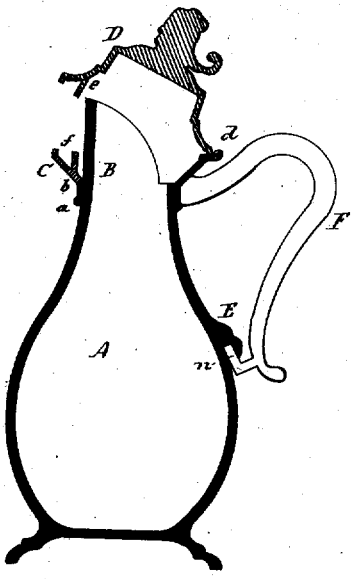
Figure 3:
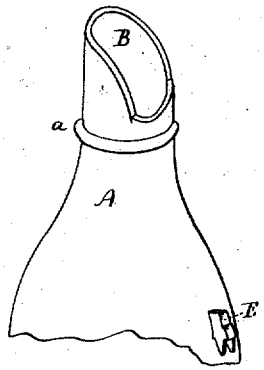

Figure 1, a vertical central section, the cover closed; Fig. 2, a vertical central section, the cover as in the act of closing; and in Fig. 3, the cup as prepared for the attachment of the top.

This invention relates to an improvement in what are commonly termed molasses or sirup cups, and designed for table use, especially to that class of cups which have a provision made for the drip to return into the cup, and with reference to those in which the cup is made from glass and the top from metal. In this class of cups the usual construction has been to make the top and pouring-spout from metal, and attach them to a glass body by means of plaster-of-paris or other suitable material.

This invention consists, first, in providing the cover of a molasses-cup having a central spout with a flange projecting downward upon the inside of the cover, so that, as the cover turns over the spout, this flange will cut the drip from the spout; second, in the arrangement of an upward-projecting flange in the drip-channel in front of the central spout; third, in a vessel the body of which is glass or similar material and the neck of metal, combining with such vessel a metallic handle, the upper end attached to or made a part of the neck, and the lower end secured to the body by a recess on the one and corresponding projection on the other.

The body A is formed, preferably, from glass, but may be of other suitable material, with a bead, *a*, around the neck; and above this bead the spout B is formed, cut back, as shown in the drawings. Around this spout above the bead the metal neck C is applied, this neck consisting of a flange, *b*, to fit closely the neck of the cup, and above flaring or projecting outward, so as to form a channel around the spout B, the bottom of the channel corresponding to the rear of the spout, so that the drip which falls into the channel will flow around and into the cup at the rear. To this neck C a cover, D, is hinged at *d*, which covers over the central spout B, and also covers the neck C, as seen in Fig. 1. Upon the inside of the cover a downward-projecting flange, *e*, is formed, so that in closing the cover, as in Fig. 2, the flange *e* will barely pass the spout, cutting off the drip.

As the drip necessarily falls directly in front, if the cup is used immediately after the drip will flow over the neck C, because it has not had time to return to the cup. To prevent this I arrange in the neck an auxiliary channel by the construction of an upward projection, *f*, vertical, or nearly so, forward of the spout B. The drip falls between this flange and the spout; therefore, as the tipping of the cup will not usually bring this flange to anything beyond a horizontal position, the drip will not flow over this point. The flange *e* on the cover and flange *f* on the neck are alike applicable to all cups having the central spout and return-channel.

In order to attach the lower end of the metal handle F to a vessel, the body of which is glass and the neck of metal, I form a socket or recess, E, upon one part—here represented as upon the body—and a corresponding projection on the other part—here represented as upon the handle—so that the two will be secured when properly set together, and the upper end of the handle secured to the metal neck by soldering or otherwise.

I claim as my invention—

1. In a molasses-cup having a central spout, B, and a surrounding return-channel for the drip, the cover D, provided with a flange, *e*, upon the inside, substantially as and for the purpose specified.

2. In a molasses-cup having a central spout, B, and a surrounding return-channel for the drip, the auxiliary channel formed by the vertical flange *f*, substantially as and for the purpose described.

3. In combination with a pitcher, the body of which is of glass or similar material, and the neck of metal, a metallic handle, the upper end of which is attached to the metal neck and the lower end secured to the glass body by a socket or recess on the one and a corresponding projection on the other, substantially as described.

EDWARD B. MANNING.

Witnesses:
A. J. TIBBITS,
J. H. SHUMWAY.